(12) United States Patent
Penza

(10) Patent No.: US 6,311,730 B2
(45) Date of Patent: Nov. 6, 2001

(54) COMMUNICATIONS CONDUIT INSTALLATION METHOD AND CONDUIT-CONTAINING PRODUCT SUITABLE FOR USE THEREIN

(76) Inventor: G. Gregory Penza, 92 Central Pkwy., Huntington, NY (US) 11743

( * ) Notice: Subject to any disclaimer, the term of this patent is extended or adjusted under 35 U.S.C. 154(b) by 0 days.

(21) Appl. No.: 09/679,987

(22) Filed: Oct. 5, 2000

(51) Int. Cl.[7] ........................................ F16L 55/16
(52) U.S. Cl. ........................ 138/98; 138/97; 138/114; 138/115; 174/47; 405/150.1; 156/287; 264/269
(58) Field of Search ..................... 138/98, 97, 111, 138/115, 116, 117, 178, 177; 174/47; 264/36.1, 269; 405/150.1, 154.1; 156/287, 292

(56) References Cited

U.S. PATENT DOCUMENTS

| | | | |
|---|---|---|---|
| 2,151,206 | 3/1939 | Hawthorn | 255/28 |
| 3,383,456 | 5/1968 | Kosak | 174/68 |
| 4,064,355 | 12/1977 | Neroni et al. | 138/115 X |
| 4,368,348 | 1/1983 | Eichelberger et al. | 138/111 X |
| 4,440,195 | 4/1984 | van Dongeren | 138/115 |
| 4,524,808 | 6/1985 | Fleischer et al. | 138/103 |
| 4,804,020 | 2/1989 | Bartholomew | 138/111 |
| 5,010,440 | 4/1991 | Endo | 138/97 X |
| 5,172,730 | * 12/1992 | Driver | 138/104 |
| 5,305,798 | 4/1994 | Driver | 138/98 |
| 5,395,472 | 3/1995 | Mandich | 138/97 X |
| 5,743,299 | 4/1998 | Chick et al. | 138/98 |
| 5,762,450 | 6/1998 | Schmager | 138/97 X |
| 5,928,447 | * 7/1999 | GianFrancisco | 156/94 |
| 5,971,029 | 10/1999 | Smith et al. | 138/98 |
| 6,058,978 | 5/2000 | Paletta et al. | 138/98 |

* cited by examiner

Primary Examiner—Patrick Brinson
(74) Attorney, Agent, or Firm—Brooks & Kushman P.C.

(57) ABSTRACT

Flexible liners for relining fluid transport pipelines contain at least one integral conduit which has no fluid communication with either the interior of the lining of the relined pipeline, or with the inside wall of the pipeline itself. The integral but substantially fluid-isolated conduit may serve to carry telecommunications or other cables, thus providing an economical means of introducing telecommunications through existing pipeline infrastructure without necessitating abandonment of the fluid transport capabilities of the pipeline.

19 Claims, 4 Drawing Sheets

COMMUNICATIONS CONDUIT INSTALLATION METHOD AND CONDUIT-CONTAINING PRODUCT SUITABLE FOR USE THEREIN

TECHNICAL FIELD

The present invention pertains to the relining of underground pipelines used for the transit of material from one location to another, through use of an expandable, flexible pipeliner, and to simultaneously providing a secure telecommunications conduit thereby.

BACKGROUND ART

Thousands of miles of pipelines of various kinds underlie the surface of both civilized and uncivilized countries, and are used for the transport, inter alia, of fluids such as drinking water, grey water, sewage, industrial waste streams, natural gas, gasoline, oil, and the like. Virtually all these types of pipelines are subject to leakage at some point, due, for example, to corrosion, rusting, or general decay of the pipeline walls, or from cracks or displacements due to shift of the earth around the pipeline, or its ground-mounted supports if located above ground. If the pipelines are located above ground, or in rural areas, replacement of the pipeline or large sections thereof may be a possibility. However, in urban environments, particularly in large cites, replacement is a sometimes impossible and always exceptionally high priced operation. Hence, methods of relining existing pipelines have been developed to extend their service life at reasonable cost.

Several relining methods have been developed over the years. All share several technological features: a flexible liner having a maximum dimension considerably less than the pipeline inside diameter is inserted into the pipeline, expanded to contact the pipeline walls, and cured or allowed to harden in place. The cured (inclusive of "cured" and "hardened") liner must be impervious to the fluid being transported, and the liner must be sufficiently thick and strong to be substantially self-supporting in order to successfully reline areas of the pipeline exhibiting severe deterioration or having large cracks.

Liners may be categorized into two broad categories, thermoplastic liners and thermoset liners.

Thermoplastic liners are liners which are generally manufactured as a continuous extruded tube of heat-softenable polymer such as polyethylene, polypropylene, polybutylene, polyethylene terephthalate, polyvinylchloride (PVC), etc. These or other thermoplastics may be specially compounded to have lower than usual softening temperatures, or standard thermoplastics may be used. The thermoplastic liners, following extrusion, are folded transversely (across the diameter) into a "C" or other section whose maximum dimension is less than the nominal outside diameter of the liner, and wound into large reels. At the job site, hot air or stream is passed through the liner, or the entire reel of liner may be enclosed in a heated building, tent, or trailer, to soften the liner and render it flexible. The liner is then introduced into the pipe through a manhole or service hole, cleanout, etc., and pulled through the pipe. Alternatively, the extruded pipe may be flattened rather than folded and wound on a reel. At this job site, the flattened liner is folded, either by hand or by machine, prior to insertion into the pipeline.

When in place, hot air or steam under pressure is applied, and the folded pipe unfolds to contact the inside diameter of the pipe. Pressure is maintained until the liner has cooled below the softening point. These liners are flexible when sufficiently heated, despite being made of relatively rigid thermoplastic of large wall thickness. It is not unusual for a liner for a 10 inch (25.4 cm) inside diameter pipe to be about 0.375 inch (ca. 1 cm) in wall thickness. Preferably, a thermoplastic having some degree of shape memory is selected so that the unfolding of the liner to its circular cross-section shape is facilitated. However, a plug, mandrel, or like device may be pulled through the still soft liner to ensure that it has unfolded properly and makes good contact with the interior pipe wall. Manufacture and installation of thermoplastic liners may be illustrated with reference to U.S. Pat. Nos. 4,867,921; 5,071,616; 5,213,727; 5,346,658; 5,368,809; 5,810,053; 5,589,131; 5,385,173; and 5,342,570.

Thermoset liners are of several types. All have a fibrous tubular structure which is impregnated, either at the time of manufacture, just prior to insertion into the pipe, or following insertion, with a thermosetting or "crosslinkable" polymer or "resin". The thermosetting polymer may contain a thermally activated catalyst, may cure by interaction with hot steam, or may be photochemically cured. While various types of liners may be used, liners based on epoxy resins or unsaturated polyester resins are preferred, particularly the latter.

The thermosettable liners may be folded across their cross-section as with the thermoplastic liners and inserted into the pipeline. Alternatively, due to their greater inherent flexibility in the uncured state, the liners may be introduced into the pipeline by "eversion", wherein newly introduced liner is inserted into previously introduced liner and everted in the pipe. This method of introducing thermosettable liners, and may be illustrated by U.S. Pat. Nos. 5,010,440; 5,486,332; 5,597,353; and 5,653,555. The liner may also, due to is inherently greater flexibility than softened rigid liner, be inserted into the pipe in a flattened state or in other configurations.

Non-wireless communication, particularly in the form of coaxial cables, fiber-optic cables, and telephone cables containing numerous wires, has proliferated greatly in recent years. Fiber optic cables, in particular, are now being resorted to or contemplated for use in providing broadband digital communication paths. There are only limited opportunities to string such cables above ground in many areas. In highly urban environments, tunnels or dedicated conduits for use with telecommunications cables are limited in size, and may not be available in all locations where they are desired.

Since pipelines have enormous geographical distribution, it would be desirable if they could be used to house telecommunications cables. Unfortunately, this is generally possible only when the pipeline has been freed from other use. One method which has been suggested to provide for cables located within a liquid or gas transport pipeline is to traverse the pipeline with a robot which mounts 'J" hooks in the topmost portion of the pipeline, the cable being supported by and between these J hooks. This method has several disadvantages, however. Not only is the cable in direct contact with the pipeline contents, but due to the installed hooks, the pipeline may no longer cleaned or refurbished by conventional means. Unless properly sealed, the points of installation of hooks may cause leakage. This method has required unusually rigid cables with special forms of insulation and cable jackets.

In U.S. Pat. No. 5,395,472, a dual leakage containment system is disclosed wherein into the original pipeline are inserted two concentric liners with spacings in-between. The spacing are said to be useable for leak detection sensors.

However, the use of two concentric liners, particularly those having a space therebetween, is not only double expensive, but also severely limits the useable cross-sectional area of the pipeline. Thus, fluid carrying capacity is diminished. Moreover, should a leak occur in the interior liner, all leak detection cables will be exposed to the fluid being transported. As indicated previously, it is generally undesirable to have cables, particularly at connection or splice points, to be in contact with liquid environments due to signal loss and to extraction of stabilizers from the cable insulation, which may result in premature failure.

It would be desirable to provide the ability to employ the presently existing, huge pipeline infrastructure for telecommunications use without necessarily abandoning the original function of the pipeline, and without exposure of the telecommunications cables to adverse environments, for example the pipeline interior surface, or liquids contained purposefully within the pipeline or those which may infiltrate between a pipeliner and the pipeline proper.

DISCLOSURE OF INVENTION

The present invention is directed to a cost-effective method of pipeline relining wherein a flexible, "curable" liner containing a major fluid transport passage and one or more totally enclosed communications cable conduits which are not in fluid communication with the liner interior or with any interstice between, is introduced into a pipeline designed and/or used for the transport of fluids, and to pipeline liners suitable for such method.

BEST MODE FOR CARRYING OUT THE INVENTION

Figure 1:
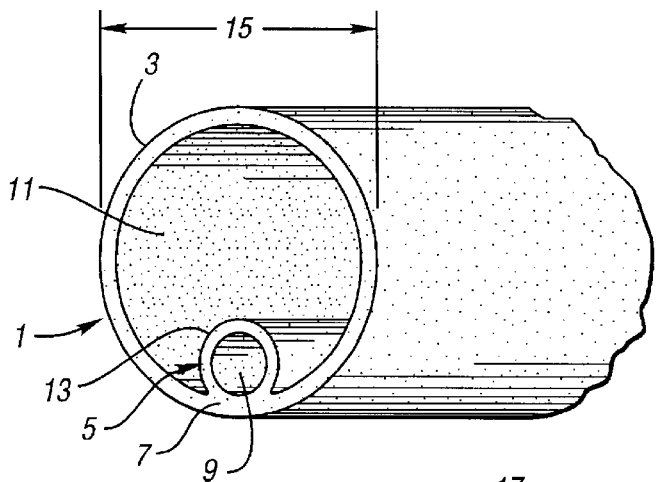
FIGS. 1–7 depict various non-limiting embodiments of pipeline liners suitable for use in the subject invention.

The conduit-providing pipe reliners of the present invention are flexible pipeline liners which incorporate at least one conduit passage whose interior is isolated from the pipeline and liner fluid passages and from the walls of the pipeline. Thus, there is no fluid communication with either the fluid transport portion of the interior of the liner when cured in place, nor with the exterior of the liner when cured in place.

The liner material may be of any type useful in pipeline relining, e.g., the thermoplastic and thermoset liners previously discussed. Preferred thermoplastic materials are polyolefin polymers such as polyethylene, polypropylene, polybutylene, and the like including co-, ter- and higher polymers containing repeating moieties derived from monomers which are copolymerizable with the olefin monomers, and halogenated thermoplastics formed from halogen-containing monomers, examples being polyvinylidene chloride, polyvinylidene fluoride, and polyvinyl chloride, particularly the latter. Such thermoplastics are widely available. The thermoplastics may also contain crosslinkable monomer-derived units which can be used to crosslink the thermoplastic following extended exposure to heat. The thermoplastics may contain a portion of already crosslinked tri- or higher functional units ("mers") so long as the ability of the pipe to be rendered flexible at reasonable temperatures is retained. The type of thermoplastic is not generally limited, and can easily be selected from numerous choices by one skilled in the art.

Flexible thermoset liners contain a fibrous structure containing any convenient fiber type, such as glass fiber, carbon fiber, textile fibers, and the like. The liners may be woven, but preferably are prepared from needle-punched or "felted" material to provide a material with sufficient thickness to carry a considerable amount of thermosettable resin. For example, a wound sleeve of oriented or non-oriented glass fiber strands (bundles) may be needle punched with barbed needles to produce a lofty, felted material. The thermosettable resin may be any conventionally used in pipeline relining, including curable unsaturated polyester, epoxy resins and the like. Blends of thermosettable polymers may be used. The thermosettable resins may be cured by heat, by moisture, or photochemically. The cure method is not limiting, except by practical or economical considerations in practice. Such resins are available from companies such as BF Goodrich, Morton, Reichold, Dow, BASF, and the like. Manufacture of thermosettable liners is disclosed in U.S. Pat. Nos. 4,581,247; 4,439,469; 4,135,958; and 4,009,063, herein incorporated by reference.

The configurations of the subject invention pipeliners may vary considerably, so long as the pipe liner contains at least one conduit which is integral with the pipeliner, the interior of which is isolated from both the inside of the pipeline liner and from the pipeline wall, including the wall of any additional liner. The configuration may be one which can be folded in a transverse manner so as to present a maximum dimension sufficiently less than the pipeline diameter that it may be inserted into the pipeline by standard liner entry techniques. Whether folded or not, the liner must be capable of insertion in the pipeline by whatever method chosen.

Figure 2:
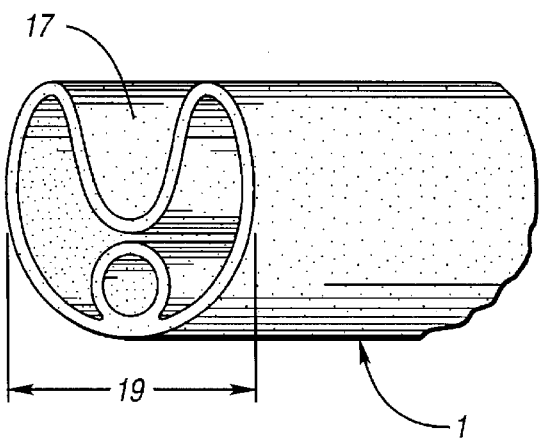

Several configurations are illustrated by the Figures. FIG. 1 illustrates thermoplastic pipeliner of the subject invention. FIG. 1 illustrates a pipeliner 1 having a relatively thick wall 3 and an overall circular cross-section. Along one portion of wall 3 is an axially extending integral conduit 5 which is joined to wall 3 at 7. The interior 9 of conduit 5 is isolated from the fluid passage 11 by wall 13. Pipeliner 1 has an outside diameter 15 which is approximately the same as the inside of the pipe being relined. Pipeliner 1 may be produced by extrusion, for example. Immediately following extrusion or upon reheating, the liner is forced, i.e., by a mandrel, to the folded shape illustrated by FIG. 2, having a "hollow" 17 the "folding" may take other forms, so long as the maximum dimension 19 is less than the inside diameter of the pipe to be relined, preferably 10% or more less, and more preferably 20% or more less than the pipeline interior diameter. The outer circumference of the liner before folding is often somewhat less than the pipeline inside diameter.

Figure 3:
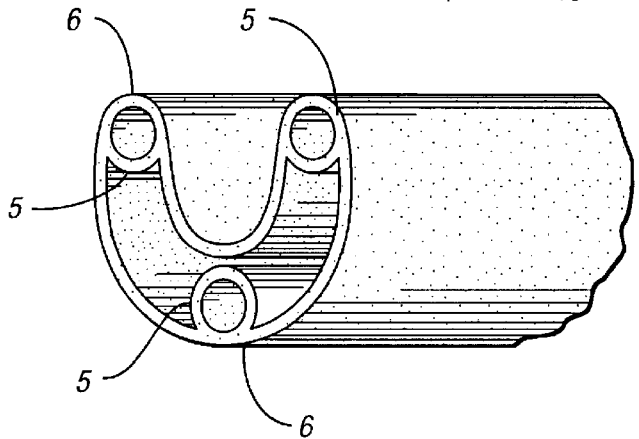
Figure 4:
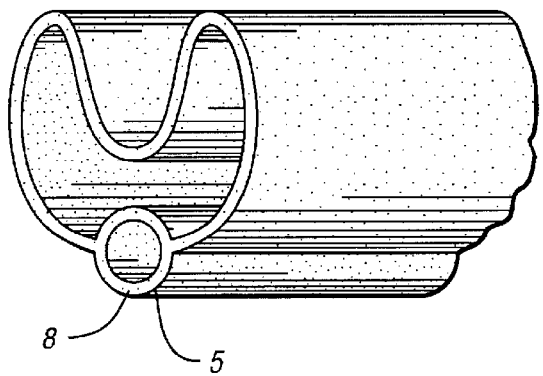
Figure 5:
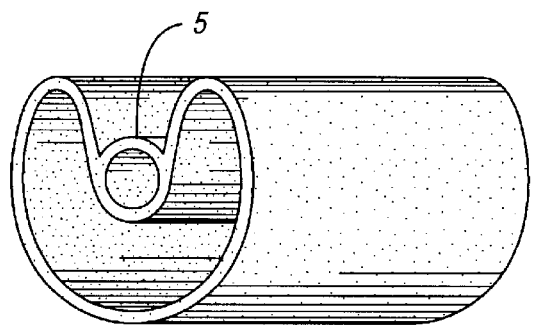
Figure 6:
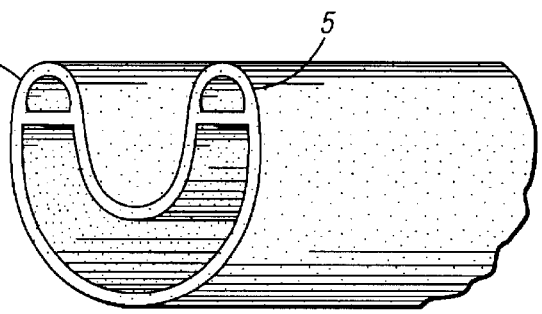
Figure 7:
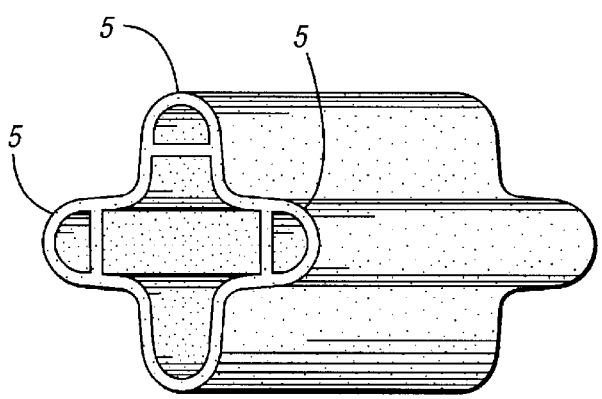
Figure 8:
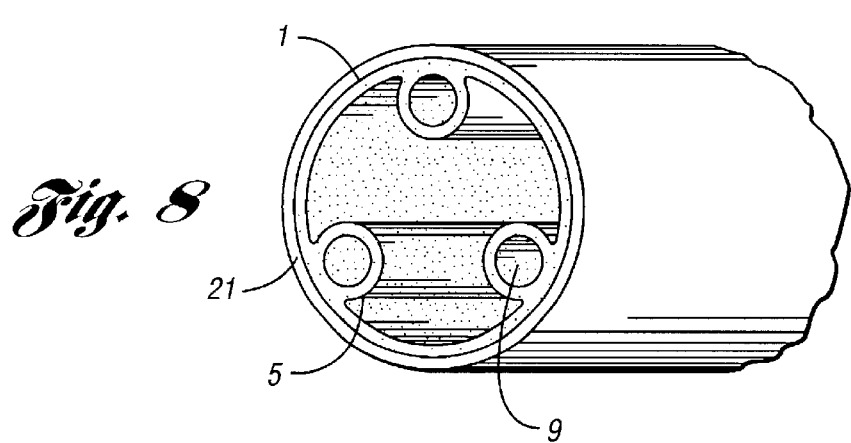
FIGS. 8–11 depict pipelines having been relined by the pipeline liners of the subject invention.
Figure 9:
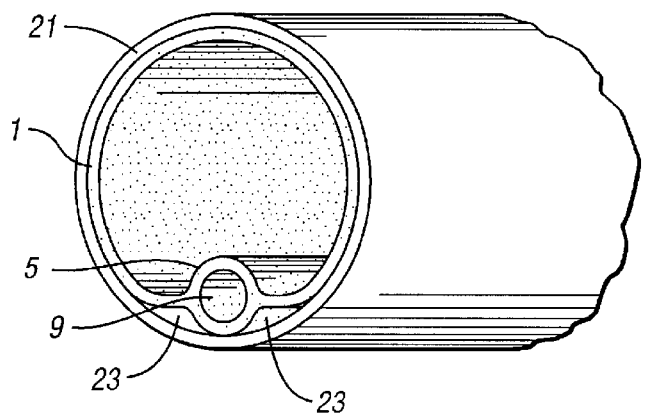
Figure 10:
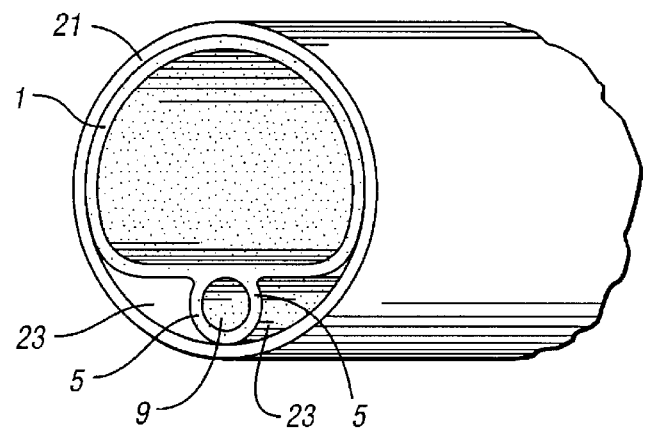
Figure 11:
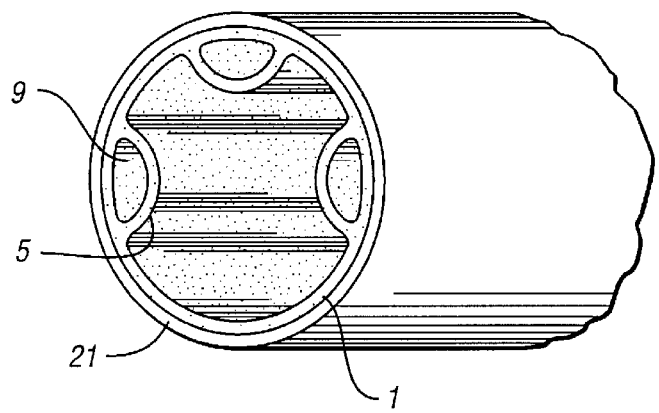

FIGS. 3 through 7, represent additional, non-limiting embodiments, where the number, shape, or location of the conduit is altered, or the manner of folding altered. In FIG. 3, three conduits 5 are located at the maximum points of curvature 7 of the C-folded pipeliner, while at FIG. 4, a single conduit is located both within and without the diameter of the pipeliner, forming a portion of the wall of the pipeline. In this case, which is a preferred embodiment, the exterior portion 8 of the conduit may be of a different color thermoplastic, co-extruded or, as with other embodiments, may be painted or otherwise marked to indicate the location of the conduit. FIG. 5 illustrates a C-folded pipe with a wholly external conduit, while the FIG. 5 pipeliner contains conduits at the ends of the arms of the "C". FIG. 7 illustrates a non-conventional but still quite useful folded configuration ("cross" configuration). Flattened, "W" and other configurations are useful as well.

FIGS. 8, 9, 10, and 11 illustrate a pipe cross-section after having been lined with the pipeliners of claims 3, 4, 5 and 7. In these figures, the pipe being relined is 21. The various other features are labeled as in the other figures. Note that in FIGS. 9 and 10, the geometrical location of the conduit 5 relative to the wall of the liner 1 creates voids 23 between the liner and the pipe inside wall. These voids can be used to contain leak sensors and their associated transmission wires. Note that in FIG. 11, the cross-section of the conduits is not round, but "D"-shaped. The cross-sectional shape of the conduit is not critical. However, the shape should be sufficiently large in cross-section so as to easily receive telecommunications cables.

FIGS. 1–11 are illustrative of thermoplastic liners which are rigid when cool, but of sufficient flexibility when hot to be inserted into pipelines, and follow pipeline bends and jogs, etc. All these configurations can be made with thermosettable resins as well. Here, however, the liner may be folded even more compactly than the thermoplastic liners. Two general methods of insertion may be used. In the first method, the liner in its folded form is inserted into the pipe, i.e., through an access port, and pushed and pulled through the pipe. A second method of installation of thermosettable liners is the eversion method. In this method, as illustrated by U.S. Pat. No. 5,010,440, the liner is manufactured inside out, and generally impregnated with resin at this point to make a resin impregnated liner. The liner may also be impregnated just prior to installation, as disclosed in U.S. Pat. No. 5,653,555, or may be impregnated after installation in the pipeline.

The liner end is inverted and secured in the pipeline, and additional liner enters through the initially secured portion, being itself everted at the end of the liner just behind it. In this method, the liner is not pulled through the pipe. Rather, the liner's only contact prior to an outward contact with the pipe wall is with the interior and snag-free surface of just-installed liner. The liner is generally manufactured a bit smaller than the interior of the pipeline. Hot air or steam under pressure may be used to cure the thermosettable resin, however, hot water is more generally used. The liner is then distorted outward and forced against the pipe wall, where it cures. Photocurable liners are also useful.

Figure 12:
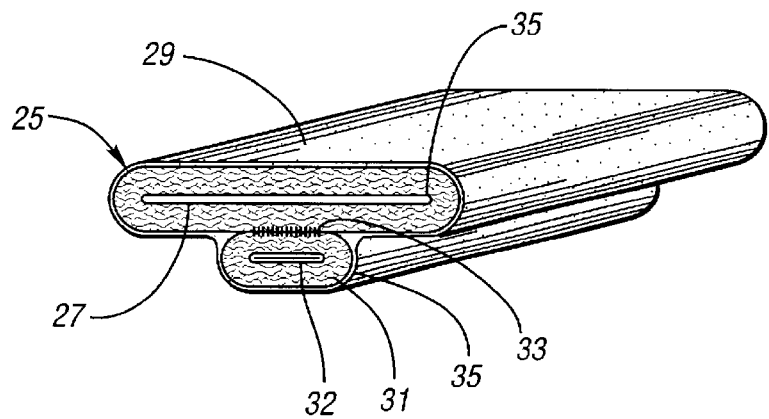
FIG. 12 depicts one embodiment of a thermosettable pipeline liner in accordance with the subject invention.

FIG. 12 illustrates one embodiment of a thermosettable resin-impregnated pipeliner of the subject invention. The liner 25 is composed of fibrous material impregnated by resin. The portion of the liner 27 which will contact the pipeline interior of the pipeline is on the inside of the liner as manufactured, while the portion 29 on the outside of the liner will form the interior of the relined pipeline. The conduit 31 is on the outside of the liner as manufactured, but will be on the inside of the relined pipeline. The conduit 31 may be made integral with the main body of the liner, but is preferably manufactured separately and secured to the liner initially by stitching 33, by hot melt glue, staples, or by resin-to-resin contact of a tacky thermosettable resin. Advantageously, the conduit 31 may be lined with a removable or unremovable axial extending bladder 32 to ensure that the conduit may be inflated and expanded properly.

Figure 13:
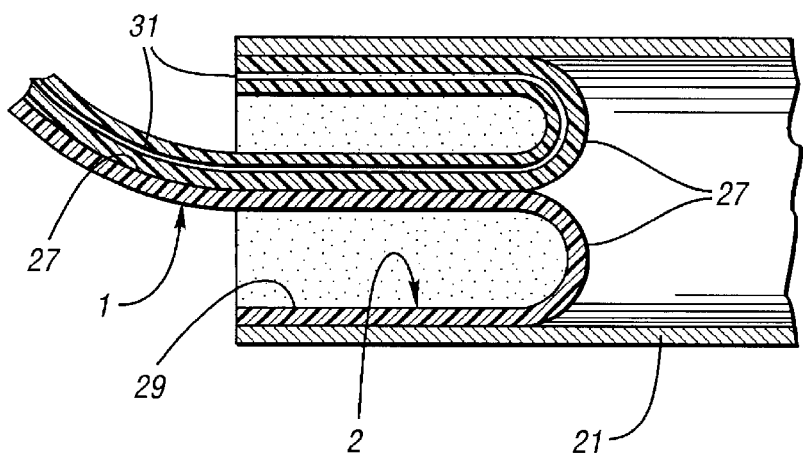
FIG. 13 depicts the liner of FIG. 12 being inserted into a pipeline by an eversion method.
Figure 14:
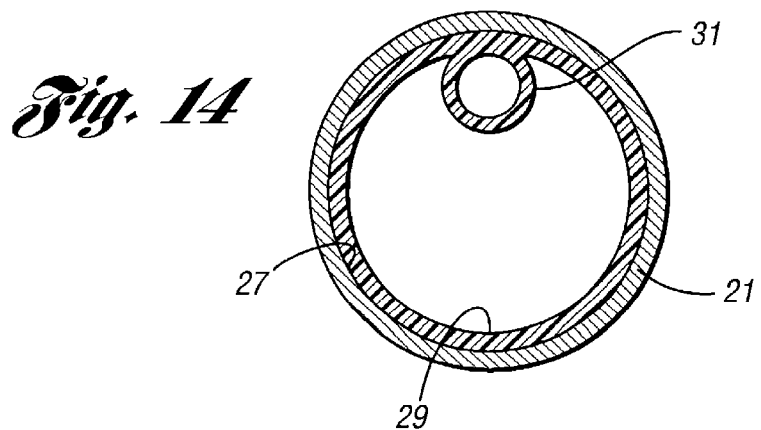
FIG. 14 depicts the cross-section of the pipe relined as in FIG. 13.

FIG. 13 illustrates insertion of the liner into the pipeline, where the liner 1, enters the pipe through already installed liner 2. Once inserted, pressure is applied to the inside of the relined fluid passage, pressing reliner walls 27/29 against the pipeline 21 interior wall, and also to the interior of the conduit 31, to expand this conduit to its expanded, designed cross-sectional shape. In practice, a higher pressure may be desired in the conduit interior. The resin is cured by hot air, steam, or photochemically. The cured liner appears in FIG. 14 in cross-section, as a liner of relined pipe 21.

The thermosettable liners may be manufactured by conventional methods, except that a conduit must also be provided for. As indicated previously, this conduit may be separately manufactured and attached by conventional means. When fiberglass felt is used for the fibrous substrate in photochemically cured system, it is desired that the refractive indices of the glass and resin match, particularly as cure progresses, as under these circumstances, maximum penetration of the curing light is made possible. Either the liner interior or exterior or both (as manufactured), may be coated with a light and/or air and/or water-impermeable film or coating 35, as shown in FIG. 12. This coating may be removed if it is located in the interior of the pipeline when cured in place, or may be left on. The film or coating may also serve to secure the conduit to the liner proper, minimizing or eliminating other means of securement. Manufacture of thermosettable liners is disclosed in U.S. Pat. Nos. 4,581,247; 4,439,469; 4,135,958; and 4,009,063, herein incorporated by reference.

Telecommunications cables or other cables, wires, etc. may be easily fed through the conduit. Once inserted, the entry is secured, for example with clamp type seals, epoxy resin "plugs", etc. The cables may be introduced at the same manhole or access port into which the liner is fed, or my be introduced into side ports located elsewhere. The devices of the subject invention are preferably used to carry cables over long distances, for example over several city blocks, rather than to individual businesses, although this use is feasible as well.

The processes of installing the liner/conduit products are substantially the same as when employing thermoplastic or thermosettable liners not employing conduits. Thus, pull and inflate, and eversion methods are useful with thermosettable liner/conduit products, for example. However, it is desirable that the location of the conduit be at points other than where access to the pipeline is necessary, i.e., at manholes, side drains, etc. In many cases, such access or branches off the main pipeline are located at specific angles from the horizon. In such cases, it is preferable to orient the liner/conduit such that the conduit portions of the liner/conduit assembly are remote from the access hole, etc., such that he conduit will not be harmed by access tools such as drills, saws, etc.

It is also possible to employ separate conduit/liner assemblies by feeding a separate conduit into the pipeline with the liner. Such a procedure may be useful, in particular, with thermosettable liners, as the conduit may be provided on the liner exterior and the liner inflated, as by curing water pressure, to substantially envelop the conduit on all sides but that of the pipeline. In the case of a thermosettable conduit, the final cured assembly may indeed produce a single cured liner/conduit assembly. However, a separate conduit may be introduced inside a liner as well. For example, a thermosettable conduit or a relatively flexible thermoplastic conduit may be contained within a thermosettable or thermoplastic liner.

The number of conduits is not especially limited in the case where thermosettable liners are used, as these liners are highly flexible prior to cure. In thermosettable liners, a large portion or even virtually the entire interior of the liner may constitute conduits. In thermoplastic liners, however, a sufficient portion of the interior must be left vacant such that the relatively heavy walled pipe can be folded. Otherwise, the liner cannot enter the pipeline. When the interior is substantially filled with a plurality of conduits, the fluid passage is necessarily restricted, and may indeed comprise only the space between adjacent conduits. It is not necessary that the fluid passage actually be used for carrying fluids. Thus, in such instances, the fluid carrying pipeline will be converted to a telecommunications only pipeline.

As noted previously, the term "flexible" as it relates to the liner means that the liner may be rendered flexible at the time of introduction into the pipeline. Thermoplastic liners, though rigid when cool, may be rendered flexible when heated, and thus satisfy this definition. Metal pipes, however, do not fall within the scope of the invention, although thermoplastic liners and thermosettable liners (which are inherently flexible, even at room temperature or below) may contain metal foils or be lined with metal foils, particularly the latter to prevent premature cure. As noted previously also, the term "cure" is meant to include both causing flexible thermoplastic to harden by cooling below the softening point, as well as curing in the sense traditionally used with crosslinkable polymers.

The term "not in fluid communication" is inclusive of systems where substantial isolation is present, but passageways are occasionally introduced for no real purpose other than to avoid infringement. In relined pipes where fluid flow will no longer take place, isolation is not required. However, the conduit should be substantially uniform in cross-section so as not to impede entry of cables. Fully isolated conduits are best for each application. By the term "integral with" is meant that the conduit and liner are not separable as employed in installation, or which provide an inseparable liner/conduit assembly after installation. An integral conduit may be prepared at the same time as the liner proper, i.e., by extrusion from the same die, or may be produced separately and secured to the liner through use of fasteners, adhesive, fusion, stitching, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a pipeline relining process comprising inserting a flexible liner into a pipeline and curing said liner in place to form a relined pipeline, the improvement comprising selecting as a liner a flexible liner having at least one hollow telecommunications conduit integral with said liner but such that the hollow of said conduit is not in fluid communication with the interior of the liner of said relined pipeline or with the wall of said pipeline.

2. The process of claim 1, wherein said flexible liner comprises a heat-softenable thermoplastic which is rigid at room temperature.

3. The process of claim 2, wherein said flexible liner is an extruded thermoplastic, extruded in a substantially circular cross-section, and folded when warm into a transversely folded configuration whose largest dimension transversely is smaller than the interior diameter of the pipeline to be relined.

4. The process of claim 3, wherein said largest dimension is minimally 10% smaller than said interior diameter of said pipeline.

5. The process of claim 1, wherein said flexible liner is a folded thermoplastic liner containing at least one conduit positioned at the maximum point of curvature of a fold.

6. The process of claim 1, wherein said liner is a thermosettable liner comprised of a fibrous wall impregnated with a cross-linkable polymer resin.

7. The process of claim 6, wherein said conduit is manufactured separately from said fibrous wall and subsequently attached to the inside of said fibrous wall.

8. The process of claim 6, wherein said process of inserting said liner into said pipeline is an eversion process employing a thermosettable liner, said thermosettable liner having said conduit attached to an exterior portion of said liner as manufactured, said conduit becoming located in the interior of said liner when everted into said pipeline.

9. The thermosettable liner of claim 7 wherein said conduit is attached to said liner by stitching, stapling, or by use of a hot melt or tacky adhesive.

10. A flexible fluid transport and communications liner suitable for relining of a fluid transport pipeline and simultaneously providing at least one fluid-isolated communications conduit, said flexible fluid transport and communications liner comprising a flexible pipeline liner portion having a shape substantially of the interior of said pipeline when cured in place, said flexible liner having at least one hollow conduit portion integral with said pipeline liner portion and extending axially along a length thereof, whose hollow is not in fluid communication with the fluid transport interior of said liner following curing in place in said pipeline, nor in fluid communication with the exterior of said liner following curing in place in said pipeline.

11. The flexible fluid transport and communications liner of claim 10, comprising a thermoplastic polymer extruded in a substantially circular cross-section, said pipeline liner portion of said flexible fluid transport and communications liner having at least one hollow conduit extruded integrally therewith, said hollow conduit(s) being located a) interior of said pipeline liner portion, b) exterior of said pipeline liner portion, or c) in the wall of said pipeline portion, or d) comprising two or more of said conduits located in more than one of the locations a), b), and c).

12. The flexible fluid transport and communications liner of claim 11, wherein a conduit is located in the wall of said pipeline liner portion, an exterior portion of said conduit being marked with or constructed of a different color, identifying the location of said conduit.

13. The flexible fluid transport and communications liner of claim 11, wherein said thermoplastic is PVC.

14. The flexible fluid transport and communications liner of claim 10, comprising a flexible thermosettable flexible fluid transport and communications liner having crosslinkable resin-impregnated pipeline liner portion and at least one crosslinkable resin-impregnated conduit portion.

15. The thermosettable flexible fluid transport and communications liner of claim 14, said conduit portion positioned interior to said pipeline liner portion as manufactured.

16. A thermosettable flexible fluid transport and communications liner of claim 14 suitable for insertion into a pipeline by the eversion method, said pipeline liner portion having at least one conduit portion positioned exterior to said pipeline liner portion as manufactured, such that upon everting into said pipeline, said at least one conduit will be located within said liner cavity.

17. The thermosettable flexible fluid transport and communications liner of claim 14 wherein said liner comprises a fibrous material impregnated with a crosslinkable resin.

18. The thermosettable flexible fluid transport and communications liner of claim 17, wherein said fibrous material comprises glass fibers and said crosslinkable resin comprises a curable unsaturated polyester resin.

19. The process of claim 1, wherein said liner is oriented radially with respect to said pipeline such that at least one telecommunications conduit is positioned such that access to the majority of access points to said pipeline will not render the conduit portion of said liner subject to penetration by access tools.

* * * * *